May 27, 1958  W. A. NEILSON  2,836,261
DETACHABLE SUPPORT PLATFORM FOR VEHICLE HOISTS
Filed June 26, 1957
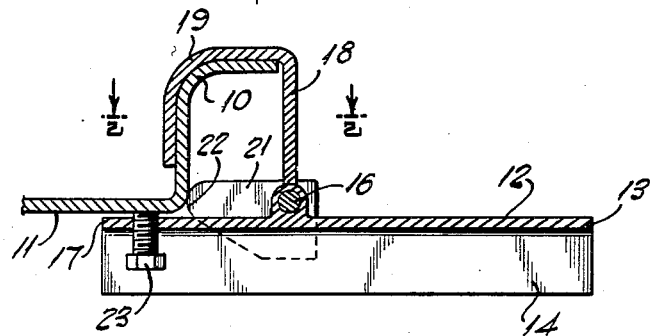
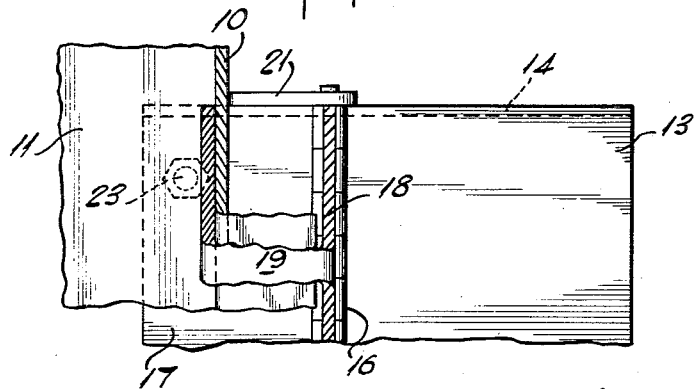
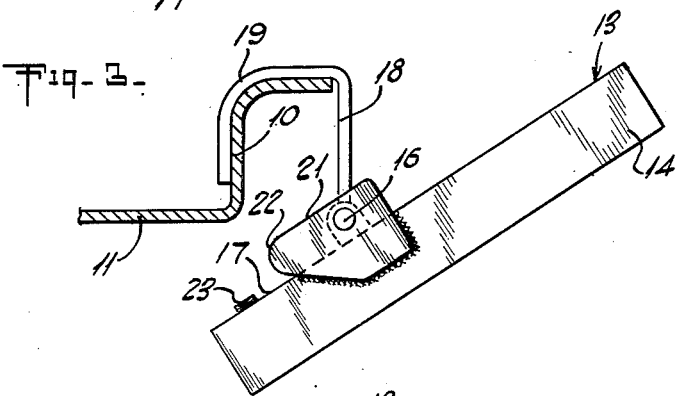
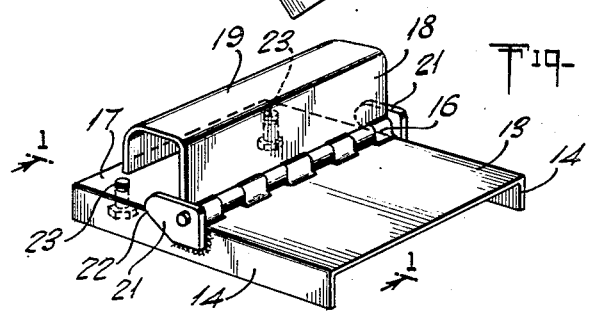
INVENTOR
WILLIAM A. NEILSON
BY Martin J. Wager
ATTORNEY

United States Patent Office 2,836,261
Patented May 27, 1958

2,836,261

DETACHABLE SUPPORT PLATFORM FOR VEHICLE HOISTS

William Andrew Neilson, Northport, N. Y.

Application June 26, 1957, Serial No. 668,132

3 Claims. (Cl. 187—8.43)

The present invention relates to an attachment for vehicle hoists and the like and more particularly to an attachment adapted to provide a supporting platform for a vehicle jack.

The present invention is an improvement of the device shown and described in my Patent No. 2,689,022 issued September 14, 1954.

It is an object of the present invention to provide a sturdy supporting platform which may be readily attached to and detached from the wheel support elements of a vehicle hoist.

In addition to the many advantages which were obtained from my original invention as described in the patent above referred to, the present invention has many advantages over the original structure.

It is an object of the present invention to provide a detachable supporting platform having a minimum number of moving parts; therefore, in the present invention the locking arm is rigidly secured to the supporting platform. This makes the device a more reliable and safer device to use as there are fewer moving parts to break or to malfunction. In my original structure a slight bending of the locking arm would cause malfunction. In the present invention, no such deficiency can occur.

Moreover, it is an object of the present invention to provide a structure that is much safer to use. There is no chance of catching a finger or a part of the hand in the locking arms as the device is placed on or removed from a vehicle support hoist. Moreover, the present structure locks more firmly into position with no looseness or play thus providing a much more stable and secure working platform.

Another object and advantage of the invention is the extreme simplicity of its structure permitting manufacture at a cost well below cost of the device shown and described in my original patent.

The present structure also has additional strength and supporting stability over the device illustrated in my previous patent. The locking arms act as an additional supporting connection between the members, and the extension of the hinge pin beyond the edges of the supporting platform gives the device additional stability with respect to any off-center load permitting the device to resist excess torque developed by any force applied other than along the center line of the supporting platform.

The provision for adjusting bolts enables the mechanic to obtain a perfectly level work platform even in those situations where the wheel support members of the vehicle hoist may have been bent out of position or covered with foreign matter.

It can thus be seen that the present invention has all of the advantages and serves all of the purposes described and illustrated in my patent above referred to and in addition thereto has the other advantages set forth herein above.

These and other objects and advantages of the present invention will be more readily apparent from the following description and drawing of one particular embodiment thereof.

In the drawing:

Fig. 1 is a sectional view taken along line 1—1 on Fig. 4;

Fig. 2 is a partially broken away sectional view taken along line 2—2 on Fig. 1;

Fig. 3 is a side elevation showing the device being secured to a vehicle hoist; and Fig. 4 is a perspective view of the device.

The detachable platform as shown in Figs. 1–3 is secured, when in use, to the side edge 10 of the wheel support track 11 of a conventional vehicle hoist.

Fig. 1 shows the supporting platform in position ready to receive a jack or other tool which is to be used by a mechanic in connection with the performance of work on a vehicle supported by the vehicle hoist with its wheels resting on the wheel support track 11. The jack or other tool is supported on the upper surface of the supporting platform portion 12 of the base plate 13.

The base plate 13 is channel shaped having depending side flanges 14 which give additional structural rigidity to the device.

The base plate 13 is divided into two portions by the hinge 16. The supporting platform portion 12 extends outwardly from the hinge 16 and the clamping portion 17 extends inwardly from the hinge 16.

Hingedly secured to the base plate 13 by hinge 16 is the hanging arm 18. The upper portion 19 of hanging arm 18 is shaped to the contour of the inner surface of the side edge 10 of the wheel support track 11. Thus, the upper portion 19 and the hanging arm 18 rest snugly against the inner surface of the side edge 10 of the wheel support track 11. Locking arms 21 are rigidly secured to the base plate 13 on either side thereof. It should be noted that the inner surface 22 of the locking arms 21 is arcuate in shape so that it will cam securely against the outer surface of the side edge 10 of the wheel support track 11. The lateral distance between the inner surface of the upper portion 19 of the hanging arm 18 and the curved surface 22 of the locking arms 21 should be substantially equal to or slightly less than the thickness of the side edge 10 of the wheel support track 11 in order to provide secure locking action. Thus, the side edge 10 of the wheel support track 11 will be locked or pinched between the inner surface of the upper portion 19 of the hanging arm 18 and the arcuate surface 22 of the locking arms 21.

Threaded through the clamping portion 17 of the base plate 13 are the adjusting bolts 23.

In order to secure the supporting platform to the wheel support track 11, the upper portion 19 of the hanging arm 18 is placed over the edge 10 of the wheel support track 11 in the position shown in Fig. 3. By rotating the base plate 13 in a clockwise direction as shown in Fig. 3, the arcuate portion 22 of the locking arms 21 will move upwardly and engage the outer surface of the side edge 10 of the wheel support track 11.

By adjustment of the bolts 23, the supporting platform portion 12 of the base plate 13 can be adjusted to the proper horizontal position.

In like manner, by simply swinging the outer end of the base plate 13 in a counter-clockwise direction as shown in Fig. 1, the supporting platform can be readily removed from the wheel support track 11 and relocated to any other desired position.

It should be noted that there are no moving parts in the device other than the hinge connection between the base plate 13 and the hanging arm 18. This provides a structure which may be easily and inexpensively manufactured while, at the same time, is both sturdy and safe in use.

I claim:

1. A detachable supporting platform for an automobile hoist having a wheel support track with substantially vertical, upwardly extending side edges, said detachable supporting platform comprising a base plate, an inverted U-shaped hanging arm adapted to engage said side edges of the wheel support track and hingedly secured to said base plate at a point remote from either extreme edge of said base plate; said hanging arm extending upwardly and inwardly from its hinged connection with said base plate; said base plate having an inwardly extending portion adapted to engage the under surface of the said wheel support track and an outwardly extending portion forming a platform; a locking arm rigidly secured to said base plate and having its inner end adapted to engage the outer surface of the side edge of the wheel support track.

2. A detachable supporting platform for an automobile hoist as claimed in claim 1 wherein the lateral distance between the outer surface of the inner end of the locking arm and the surface of the inner end of the U-shaped hanging arm is substantially equivalent to the thickness of the material from which the upwardly extending portion of the side edge of the wheel support track is comprised.

3. A detachable support platform as claimed in claim 1 including engaging members for engaging the under surface of said wheel support track and means for adjusting the distance betwen the point of engagement of said engaging members with the under surface of the wheel support track and the base plate.

No references cited.